(12) United States Patent
Bakx

(10) Patent No.: US 8,531,929 B2
(45) Date of Patent: *Sep. 10, 2013

(54) RECORDING METHODS AND DEVICES FOR RECORDING INFORMATION ON DUAL LAYER RECORDABLE DISKS

(75) Inventor: Johannus Leopoldus Bakx, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/161,525

(22) Filed: Jun. 16, 2011

(65) Prior Publication Data

US 2012/0155234 A1 Jun. 21, 2012

Related U.S. Application Data

(63) Continuation of application No. 10/562,896, filed as application No. PCT/IB2004/051011 on Jun. 25, 2004, now Pat. No. 7,986,598.

(30) Foreign Application Priority Data

Jul. 1, 2003 (EP) .................................. 03077059

(51) Int. Cl.
*G11B 7/00* (2006.01)

(52) U.S. Cl.
USPC ....... 369/47.5; 369/116; 369/13.39; 369/13.4

(58) Field of Classification Search
USPC ..................................................... 369/13.39
See application file for complete search history.

(56) References Cited

U.S. PATENT DOCUMENTS

| | | | |
|---|---|---|---|
| 6,738,329 B2 * | 5/2004 | Hsiao | 369/47.53 |
| 2003/0063535 A1 | 4/2003 | Shoji et al. | |
| 2003/0137910 A1 | 7/2003 | Ueda et al. | |
| 2003/0227846 A1 * | 12/2003 | Lee et al. | 369/53.21 |
| 2004/0125738 A1 | 7/2004 | Lee et al. | |
| 2004/0156294 A1 | 8/2004 | Watanabe et al. | |
| 2005/0041555 A1 | 2/2005 | Ogawa | |

FOREIGN PATENT DOCUMENTS

| | | |
|---|---|---|
| CN | 1135632 A | 11/1996 |
| EP | 0715301 A2 | 6/1996 |
| EP | 1244096 A1 | 9/2002 |
| EP | 1318509 A1 | 6/2003 |
| JP | 2001344753 A | 12/2001 |
| JP | 2004310977 A | 11/2004 |
| WO | 02086873 A1 | 10/2002 |
| WO | 2005001824 A1 | 1/2005 |

OTHER PUBLICATIONS

ISR for Publication International Publication No. WO2005/004119, Jan. 13, 2005.

* cited by examiner

*Primary Examiner* — Lixi C Simpson

(57) ABSTRACT

The invention relates to recording methods for recording information on a dual layer recordable disk, and to corresponding recording devices. In one such method and recording device the OPC-area is variably located on a layer of the disk. In a preferred embodiment the OPC-area is located relative close to the radius where the data stream switches from the first layer to the second layer. This reduced additional time required for jumping to a fixed OPC-area. Furthermore, in another such method and device the information to be recorded is equally divided over both layers of the dual layer disc. This avoids additional time required for finalization.

26 Claims, 3 Drawing Sheets

RECORDING METHODS AND DEVICES FOR RECORDING INFORMATION ON DUAL LAYER RECORDABLE DISKS

This is a continuation of prior application Ser. No. 10/562,896 filed 2005 Dec. 29 now U.S. Pat. No. 7,986,598, which is a 371 of international application IB2004/051011 filed 2004 Jun. 25, which claimed priority of EP 03077059.8 filed 2003 Jul. 1, which are all incorporated in whole by reference herein.

The invention relates to recording methods for recording information on a dual layer recordable disk, the methods comprising a step of performing an Optimum Power Control (OPC) procedure for determining an actual optimum writing power, said Optimum Power Control procedure being performed in an OPC-area on the disk. The invention further relates to the corresponding recording devices for recording information on dual layer recordable disks using these methods.

For recordable dual-layer media (both write-once and rewritable), such as for example DVD+R disks and DVD+RW disks, that need to be read-compatible with read-only dual-layer disks, there is the issue of how to deal with an amount of data that requires a storage space occupying more than one layer of the dual layer disk, but less than two full layers.

Figure 1:
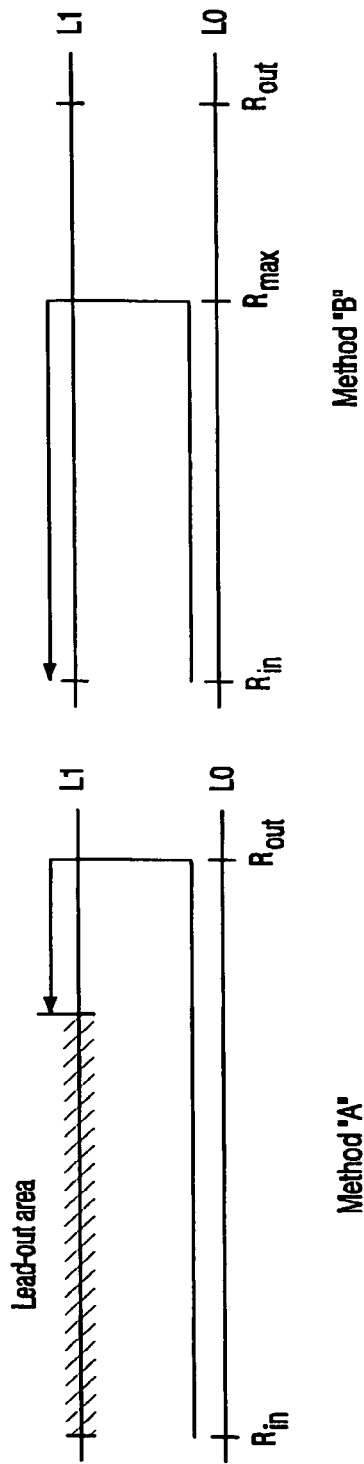
FIG. 1 schematically compares two recording methods of the invention.

A first recording method for recording information on such a dual layer recordable disk, method A, is depicted in the left-hand side of FIG. 1. In this method, first a first layer L0 is written completely full, and subsequently the remainder of the data is written on a second layer L1. A second recording method for recording information on a dual layer recordable disk, method B, is depicted in the right-hand side of FIG. 1. In this method, the data to be written is equally divided between both layers L0 and L1.

Figure 2:
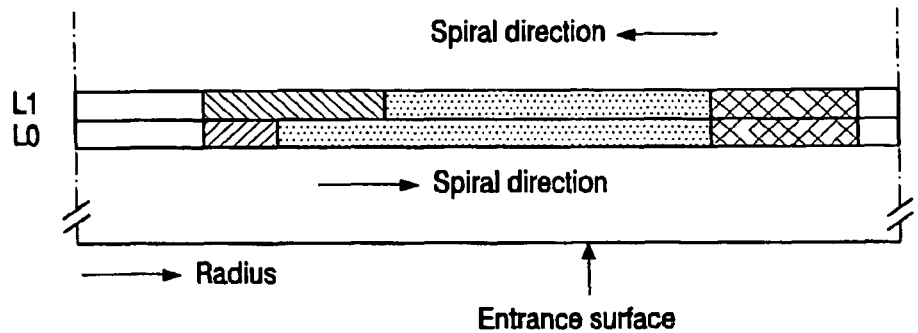
FIG. 2 schematically illustrates an Opposite Track Path (OTP) disc.

Here L0 is defined to be the layer closest to the recording lens in a recording device, and therefore also closest to the entrance surface of the laser beam in the disk. L1 is the other layer. In order to clarify this more, the layout of a dual layer DVD-ROM disk according to Standard ECMA-267 is depicted in FIG. 2 for a so-called OTP (Opposite Track Path) disk. As is described in this Standard, the spiral direction of layer L0 is opposite to the spiral direction of layer L1 in an OTP type disk.

In method A, first layer L0 is written from radius $R_{in}$ to $R_{out}$ (which are 24 mm and 58 mm for DVD type media). Next, the laser spot (used for recording the data in a layer) jumps from layer L0 to layer L1 and the remainder of the data is written. Depending on the amount of data to be recorded on the disk, layer L1 is written up to a certain radius. However, in order to guarantee playback on existing DVD players (especially DVD-Video and DVD-ROM players), the remaining part of layer L1 must be written also (for example with dummy data). This is because some players immediately jump from one layer to the other layer when the target of a seek command is located on the other layer. If no data were to be found after the layer jump (because the location jumped to does not have any data recorded there), the player is very likely to crash and/or report a fatal error as no tracking can be performed in the absence of data written on the disk at that location. By writing a long lead-out area, as shown in the left-hand side of FIG. 1, compatibility with existing DVD players can be assured. However, the may require lengthy additional time to write the lead-out area ('finalization').

This additional time is avoided by applying recording method B. Here the data is equally divided between both layers L0 and L1, which implies a certain maximum radius $R_{max}$ beyond which no data is written on both layer L0 and layer L1. The value of $R_{max}$ is variable and depends on the amount of data to be recorded on the disk.

However, another problem occurs during recording. When the laser spot jumps from layer L0 to layer L1, an Optimum Power Control (OPC) procedure has to be carried out on layer L1 before the recording can proceed. As is well-known to a person skilled in the art, an Optimum Power Control procedure is a procedure for determining the actual optimum writing power for recording information on a layer of a disk. This optimum writing power depends on the disk, the recorder, and the recording speed that is actually used. Therefore, this optimum writing power should be determined for each recorder/disk combination at the actual recording speed. This Optimum Power Control procedure is generally performed in a fixed area on the disk that is specially reserved for this purpose, the so-called OPC-area.

When this OPC-area is located at the inner or outer radius of the disk, as is the case for single-layer media, first an access to that (inner or outer) radius must be carried out. This jump requires a certain amount of extra time. Especially when recording is done in CLV-mode, where a jump involves a change in disk rotation speed, a considerable amount of extra time may be required. During this extra time the data stream generally continues, which has to be captured in a memory buffer. Therefore such a buffer has to be larger than when no jump is needed. It is noted that the OPC procedure is performed "on the fly" when switching from layer L0 to layer L1.

It is object of an embodiment to provide a method in which the amount of extra time is reduced. This object is achieved by providing a method wherein the Optimum Power Control procedure is performed in an OPC-area variably located on at least one of the layers (L0, L1) of the dual layer disk.

The method and recorder according to an embodiment employ a variable position of the OPC-area, the position depending on the amount of data to be recorded on the disk. In another embodiment the method and recorder use an OPC-area positioned on the second layer, L1, located relatively close to the radius where the data stream switches from the first to the second layer (such as $R_{max}$ in method B). This radius depends on the amount of information to be recorded on the disk.

Figure 3:
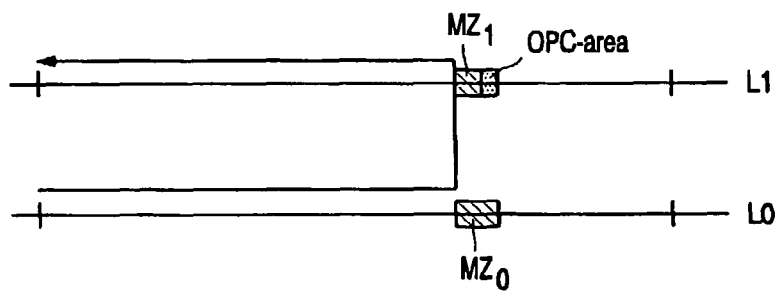
FIG. 3 schematically illustrates an Optimum Power Control (OPC) area defined in the Middle Zone of the Opposite Track Path disc of the invention.

In a version of a method according to another embodiment, the OPC-area is located in the so-called Middle Zone of layer L1 in order to realize a fast "on-the-fly" OPC-procedure at the radius of the layer jump (as is shown in FIG. 3, where MZ0 denotes the part of the Middle Zone located in layer L0 and MZ1 denotes the part of the Middle Zone located in layer L1). This Middle Zone is defined for DVD-ROM disks in the above-mentioned Standard ECMA-267.

Figure 4:
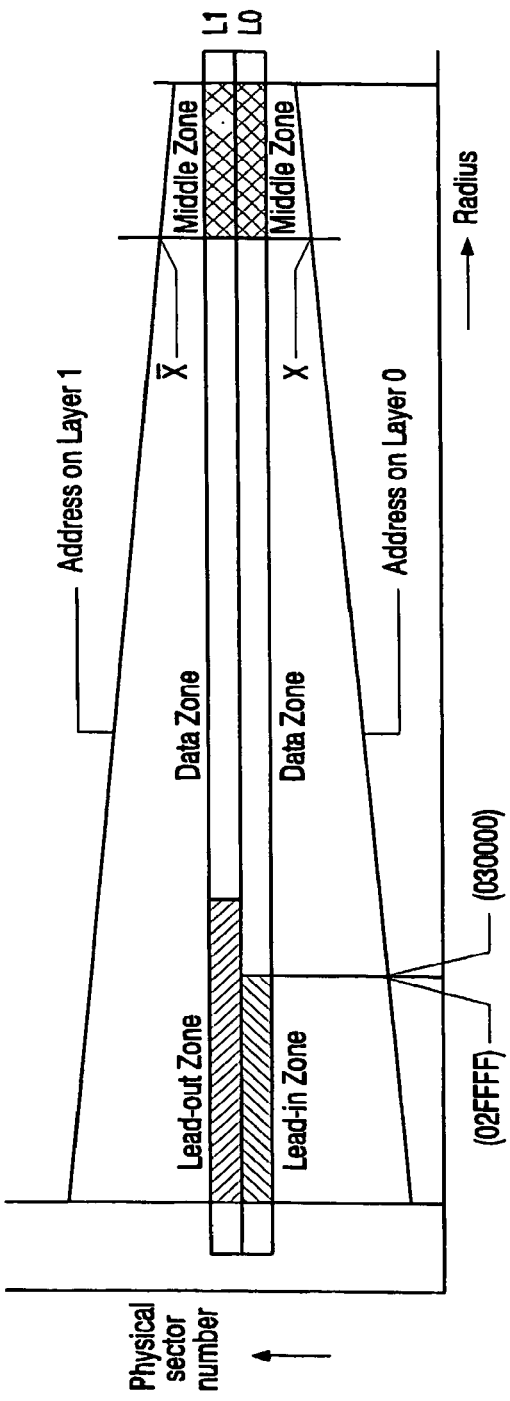
FIG. 4 schematically illustrates a more detailed view of the left side of Opposite Track Path disc shown in FIG. 3.

According to Standard ECMA-267, the Information Zone (or Data Zone) has a Middle Zone in each layer to allow the laser spot to move from layer L0 to layer L1. This is shown in FIG. 4. The Middle Zone can be considered as a kind of intermediate lead-out area on a dual layer disk. According to the standard, the Middle Zone extends 1 mm beyond the last written location on layer L0. This is sufficient to incorporate an OPC-area. It is noted however that the OPC-area may extend beyond the 1 mm boundaries of the Middle Zone.

It should be noted that the embodiments can provide an additional advantage in more accurately determining the optimum writing power after a layer jump. If, after a layer jump, an OPC-procedure were to be performed at the inner or outer radius of the disk, this would not lead to optimum power control because the OPC-procedure is being performed at a position that is different from the start position of the actual recording on layer L1. The properties of the disk at the outside can vary from the properties at the actual recording position.

In another embodiment, a further Optimum Power Control procedure is performed in a fixed and reserved OPC-area. Similar to single layer disks, such a fixed OPC-area may be located at the inner radius and/or the outer radius of the disk. This further Optimum Power Control procedure may, for example, be performed to determine an initial optimum writing power to be used when starting writing on layer L0. Furthermore, an initial optimum writing power may be determined for each of the layers individually.

Although various embodiments have been described above, it will be evident that other embodiments may be alternatively used to achieve the same object. The scope of the invention is therefore not limited to the embodiments described above, but can also be applied to all kinds of recordable media (both write-once and rewritable), such as for example DVD+R, DVD+RW, DVD-R, DVD-RW, DVD-RAM, and Blu-ray Disk.

Furthermore, the embodiments described above detail writing data first to layer L0 and subsequently to layer L1. However, it should be noted that embodiments work equally well when data is written first to layer L1 and subsequently to layer L0. Moreover, the scope of the invention is not limited to dual layer disks only, but can be applied on multiple layer disks consisting of more than two layers for storing data as well.

The invention claimed is:

1. A recording method for recording information on a dual layer recordable disk, the method comprising an act of:
   performing an Optimum Power Control (OPC) procedure for determining an actual optimum writing power, the Optimum Power Control procedure being performed in an OPC-area on the disk, the OPC-area being variably located on a second layer of the dual layer disk, the variable location being selected based on an amount of information to be recorded on a first layer of the dual layer disk.

2. The recording method of claim 1, wherein the location of the OPC-area on at least one of the layers of the dual layer disk depends on a total amount of information to be recorded on the disk.

3. The recording method of claim 1, wherein the OPC-area is located in a Middle Zone of at least one of the layers of the dual layer disk.

4. The recording method of claim 1, comprising an act of performing a further Optimum Power Control (OPC) procedure, the further Optimum Power Control procedure being performed in a further OPC-area located at a predetermined fixed position on at least one of the layers of the dual layer disk and the further OPC-area being reserved for use by the further Optimum Power Control procedure.

5. The recording method of claim 4, wherein the further Optimum Power Control procedure is performed in a first fixed OPC-area located on the first layer of the dual layer disk and in a second fixed OPC-area located on the second layer of the dual layer disk.

6. The recording method of claim 1, wherein the OPC-area is located in a Middle Zone of at least one of the layers of the dual layer disk.

7. A recording device for recording information on a dual layer recordable disk, the device comprising a portion configured to perform an Optimum Power Control (OPC) procedure for determining an actual optimum writing power, the OPC procedure being performed in an OPC-area on the disk, and the portion being configured to variably locate the OPC-area on a second layer of the dual layer disk, the variable location being selected based on an amount of information to be recorded on a first layer of the dual layer disk.

8. The recording device of claim 7, wherein the portion is configured to locate the OPC-area in a Middle Zone of at least one of the layers of the dual layer disk.

9. A recording method for recording information on a dual layer recordable disk, the method comprising acts of:
   dividing the information to be recorded into substantially equally divided parts between a first layer and a second layer of the dual layer disk, and
   performing an Optimum Power Control (OPC) procedure for determining an actual optimum writing power, the OPC procedure being performed in an OPC-area on the disk, the OPC-area being variably located on a second layer of the dual layer disk, the variable location being selected based on an amount of information to be recorded on a first layer of the dual layer disk.

10. The recording method of claim 9, wherein the OPC-area is located in a Middle Zone of at least one of the layers of the dual layer disk.

11. The recording method of claim 9 wherein the Optimum Power Control procedure is performed in OPC-areas variably located on each of the layers of the dual layer disk.

12. The recording method of claim 9, wherein the location of at least one of the OPC-areas on the layers of the dual layer disk depends on the amount of information to be recorded on both layers of the disk.

13. A recording device for recording information on a dual layer recordable, the device comprising a portion configured to divide the information to be recorded into substantially equally divided parts between a first layer and a second layer of the dual layer disk, and the portion being configured to perform an Optimum Power Control (OPC) procedure for determining an actual optimum writing power, the OPC procedure being performed in an OPC-area on the disk, the OPC-area being variably located on a second layer of the dual layer disk, the variable location being selected based on an amount of information to be recorded on a first layer of the dual layer disk.

14. The recording device of claim 13, wherein the portion is configured to locate the OPC-area in a Middle Zone of at least one of the layers of the dual layer disk.

15. A recording method for recording a data stream of information on a multiple layer recordable disk comprising the steps of:
   providing the multiple layer recordable disk with a plurality of recording layers configured such that there is a first layer that is recorded upon first and at least one other layer that is recorded on after the first layer has been recorded upon;
   performing an Optimum Power Control (OPC) procedure for determining an actual optimum writing power on the at least one other layer, wherein said Optimum Power Control procedure is performed in an OPC-area on the disk, the OPC-area being variably located on the at least one other layer, the variable location being at a radius close to the radius where the data stream switches layers when reading or writing a stream of data to the disk.

16. The recording method of claim 15, wherein the OPC-area is located in a Middle Zone of the at least one other layer of the dual layer disk.

17. The recording method of claim 15, comprising:
performing a further Optimum Power Control (OPC) procedure, said further Optimum Power Control procedure being performed in a further OPC-area located at a predetermined fixed position on at least one of the layers of the multiple layer disk, the further OPC-area being reserved for use by the further Optimum Power Control procedure.

18. The recording method of claim 17, wherein:
the disk is a dual layer disk, and
the further Optimum Power Control procedure is performed in a first OPC-area at a predetermined fixed location on a first layer of the multiple layer disk and in a second OPC-area at a predetermined fixed location on a second layer of the dual layer disk.

19. The recording method of claim 15, wherein the OPC-area is located in a Middle Zone for the at least one other layer such that the Middle Zone extends 1 mm beyond the radius of a last written location of the first layer.

20. The recording method of claim 15, wherein the OPC-area is located in and extending beyond a Middle Zone for the other layer such that the Middle Zone extends 1 mm beyond the radius of a last written location of the first layer.

21. The recording method of claim 15, wherein the OPC-areas are located in a Middle Zone for each of the other layers such that the Middle Zones extend 1 mm beyond the radius of a last written location of the previous layer.

22. The recording method of claim 15 comprising:
dividing the information to be recorded into substantially equally divided parts between a first layer and a second layer of the dual layer disk.

23. A recording device for recording information on a dual layer recordable disk, the device comprising: a portion configured to divide the information to be recorded into substantially equally divided parts between a first layer and a second layer of the dual layer disk, and the portion being configured to perform an Optimum Power Control (OPC) procedure for determining an actual optimum writing power, the OPC procedure being performed in an OPC-area on the disk, the OPC-area being variably located on a second layer of the dual layer disk, the variable location being selected based on an amount of information to be recorded on a first layer of the dual layer disk.

24. A dual layer disk comprising: an Optimum Power Control (OPC) area written on the disk by an OPC procedure for determining an actual write power, the OPC-area being variably located on a second layer of the dual layer disk, the variable location being selected based on an amount of information recorded on a first layer of the dual layer disk.

25. The disk of claim 24 comprising:
substantially equal portions of information recorded in a first layer and a second layer of the disk.

26. A duel layer disk comprising:
substantially equal portions of information recorded in a first layer and a second layer;
an Optimum Power Control (OPC) area written by an OPC procedure for determining an actual optimum writing power on the second layer, wherein said Optimum Power Control procedure is performed in an OPC-area on the disk, the OPC-area being variably located on the second layer, the variable location being at a radius close to the radius where the data stream switches layers when reading or writing a stream of data to the disk.

* * * * *